US008718010B2

(12) United States Patent
Chun et al.

(10) Patent No.: US 8,718,010 B2
(45) Date of Patent: May 6, 2014

(54) METHOD FOR TRANSMITTING FRAME IN WIRELESS COMMUNICATION SYSTEM INCLUDING RELAY STATION

(75) Inventors: Jin Young Chun, Seoul (KR); Han Gyu Cho, Seoul (KR); Jin Sam Kwak, Seoul (KR); Dong Guk Lim, Seoul (KR); Bin Chul Ihm, Seoul (KR); Young Soo Yuk, Seoul (KR)

(73) Assignee: LG Electronics Inc., Seoul (KR)

( * ) Notice: Subject to any disclaimer, the term of this patent is extended or adjusted under 35 U.S.C. 154(b) by 552 days.

(21) Appl. No.: 12/870,543

(22) Filed: Aug. 27, 2010

(65) Prior Publication Data

US 2011/0051629 A1  Mar. 3, 2011

Related U.S. Application Data

(60) Provisional application No. 61/237,693, filed on Aug. 28, 2009, provisional application No. 61/237,707, filed on Aug. 28, 2009, provisional application No. 61/242,803, filed on Sep. 16, 2009.

(30) Foreign Application Priority Data

Mar. 26, 2010  (KR) .................. 10-2010-0027272

(51) Int. Cl.
*H04W 4/00* (2009.01)
(52) U.S. Cl.
USPC ............... 370/330; 370/437; 370/492; 455/7
(58) Field of Classification Search
USPC ...................... 370/241, 279; 455/7
See application file for complete search history.

(56) References Cited

U.S. PATENT DOCUMENTS

| 8,155,045 | B2* | 4/2012 | Sherman et al. | 370/312 |
| 8,233,398 | B2* | 7/2012 | Oh et al. | 370/241 |
| 8,265,044 | B2* | 9/2012 | Zhang et al. | 370/336 |
| 2008/0220790 | A1* | 9/2008 | Cai et al. | 455/450 |
| 2010/0272066 | A1* | 10/2010 | Wang et al. | 370/331 |

OTHER PUBLICATIONS

IEEE Std 802.16j, "Part 16: Air Interface for Broadband Wireless Access Systems—Amendment 1: Multihop Relay Specification," Jun. 2009.

(Continued)

*Primary Examiner* — Yemane Mesfin
*Assistant Examiner* — Henry Baron
(74) *Attorney, Agent, or Firm* — Lee, Hong, Degerman, Kang & Waimey

(57) ABSTRACT

A method of transmitting a frame of a relay station (RS) in a wireless communication system employing the RS is provided. The method includes: receiving frame configuration information on an RS frame from a base station (BS); configuring a frame including a downlink (DL) access zone for transmitting a signal to a relay user equipment (UE), a DL receive zone for receiving a signal from the BS, an uplink (UL) access zone for receiving a signal from the relay UE connected to the RS, a UL transmit zone for transmitting a signal to the BS, and a transition gap; and transmitting a signal in at least one of the UL access zone and the UL transmit zone, wherein the transition gap is a switching time between a transmission operation and a reception operation of the RS and is included in at least one of the DL access zone and the UL transmit zone.

7 Claims, 14 Drawing Sheets

(56) References Cited

OTHER PUBLICATIONS

J. Sydir et al., "An evolved cellular system architecture incorporating relay stations," IEEE Communications Magazine, pp. 115-121, Jun. 2009.

S.W. Peters et al., "The future of WiMAX: Multihop relaying with IEEE 802.16j," IEEE Communications Magazine, pp. 104-111, Jan. 2009.

Z. Tao et al., "Frame structure design for IEEE 802.16j mobile multihop relay (MMR) networks," IEEE Global Telecommunications Conference 2007, pp. 4301-4306, Nov. 2007.

* cited by examiner

METHOD FOR TRANSMITTING FRAME IN WIRELESS COMMUNICATION SYSTEM INCLUDING RELAY STATION

CROSS-REFERENCE TO RELATED APPLICATIONS

This application claims the benefit of priority to U.S. Provisional applications Ser. No. 61/237,693 filed on Aug. 28, 2009, Ser. No. 61/237,707 filed on Aug. 28, 2009, and Ser. No. 61/242,803 filed on Sept. 16, 2009 and the benefit of earlier filing date and right of priority to Korean Patent Application No. 10-2010-0027272 filed on Mar. 26, 2010 the contents all of which are incorporated by reference herein in their entirety.

BACKGROUND

1. Technical Field

The present invention relates to wireless communications, and more particularly, to a method of transmitting frames in a wireless communication system including a relay station.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

In order to maximize efficiency of limited radio resources, an effective transmission and reception scheme and utilization methods thereof have been proposed in a broadband wireless communication system. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Meanwhile, a wireless communication system employing a relay station (RS) has recently been developed. The RS is employed for cell coverage extension and transmission capability improvement. A base station (BS) provides a service to a user equipment (UE) located in a coverage boundary of the BS via the RS, and thus can obtain an effect of extending the cell coverage. In addition, the RS improves signal transmission reliability between the BS and the UE, thereby improving transmission capacity. Even if the UE is located inside the coverage of the BS, the RS may be used when the UE is located in a shadow area.

The RS is generally classified into two types. A first type is a transparent RS which simply relays data, which is transmitted from the BS, to a subordinate RS or the UE while the BS determines all pieces of information required for a relay process. The transparent RS uses the same carrier frequency as that used by a superordinate or subordinate station. A second type is a non-transparent RS which relays data by directly performing operations necessary for the relay process, such as resource allocation, modulation and coding scheme (MCS) level determination, transmit power control, etc. The non-transparent RS may use the same carrier frequency as that used in the superordinate or subordinate station or may use a different frequency.

A centralized scheduling mode is a mode in which a BS determines frequency band allocation of an RS and a relay UE. A distributed scheduling mode is a mode in which the RS cooperates with the BS to determine frequency band allocation for the relay UE. A transparent RS can operate only in the centralized scheduling mode. A non-transparent RS can operate either in the centralized scheduling mode or the distributed scheduling mode.

Examples of a relay scheme used in the RS include an amplify and forward (AF) scheme and a decode and forward (DF) scheme. When using the AF scheme, the RS amplifies data transmitted from the BS and then delivers the data to the UE. When using the DF scheme, the RS decodes data transmitted from the BS to identify a destination station, and encodes the decoded data and then relays the data to the subordinate RS or the UE which is the destination station.

The wireless communication system employing the RS requires a new frame structure different from the conventional frame structure. A frequency band used by the RS to transmit a signal to the BS may be identical to a frequency band used to receive a signal from the relay UE. Alternatively, a frequency band used by the RS to receive a signal from the BS may be identical to a frequency band used to transmit a signal to the relay UE. Due to self interference, it is difficult for the RS to simultaneously transmit and receive signals in the same frequency band. Therefore, a transition gap is required to switch an operation mode between signal transmission and signal reception.

Accordingly, there is a need for a frame structure considering the transition gap and a frame transmission method in a wireless communication system.

SUMMARY

The present invention provides a frame structure and a frame transmission method in a wireless communication system.

According to an aspect of the present invention, a method of transmitting a frame of a relay station (RS) in a wireless communication system employing the RS is provided. The method includes: receiving frame configuration information on an RS frame from a base station (BS); configuring a frame including a downlink (DL) access zone for transmitting a signal to a relay user equipment (UE), a DL receive zone for receiving a signal from the BS, an uplink (UL) access zone for receiving a signal from the relay UE connected to the RS, a UL transmit zone for transmitting a signal to the BS, and a transition gap; and transmitting a signal in at least one of the UL access zone and the UL transmit zone, wherein the transition gap is a switching time between a transmission operation and a reception operation of the RS and is included in at least one of the DL access zone and the UL transmit zone.

According to another aspect of the present invention, a method of transmitting a frame of a relay station (RS) in a wireless communication system employing the RS is provided. The method includes: receiving frame configuration information on an RS frame from a base station (BS); configuring a time division duplex (TDD) frame comprising a downlink (DL) access zone for transmitting a signal to a relay user equipment (UE), a DL receive zone for receiving a signal from the BS, an uplink (UL) access zone for receiving a signal from the relay UE connected to the RS, a UL transmit zone for transmitting a signal to the BS, and a transition gap; and transmitting a signal in at least one of the DL access zone and the UL transmit zone, wherein the transition gap is a switching time between a transmission operation and a reception operation of the RS and is included in at least one of the DL receive zone and the UL access zone.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, the following description will focus on the IEEE 802.16m. However, technical features of the present invention are not limited thereto.

Figure 1:
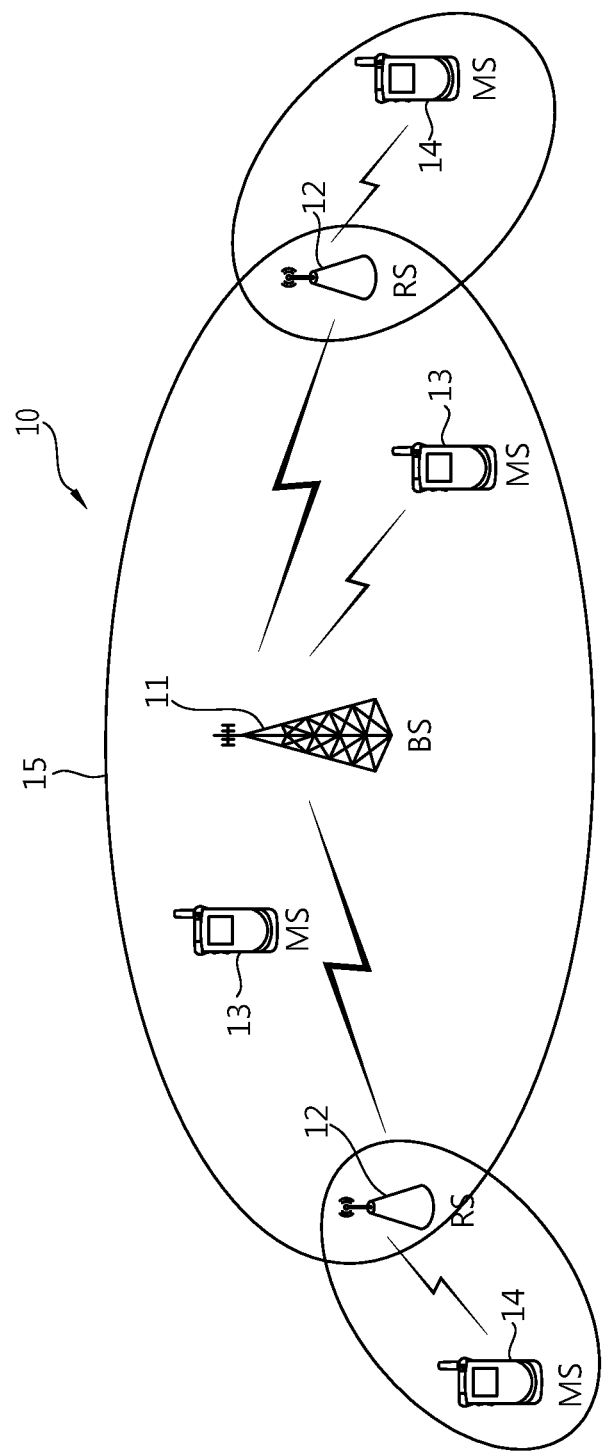
FIG. 1 shows a wireless communication system employing a relay station.

FIG. 1 shows a wireless communication system employing a relay station.

Referring to FIG. 1, a wireless communication system 10 employing a relay station (RS) 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), an advanced BS (ABS), etc. The BS 11 can perform functions such as connectivity between the RS 12 and a UE 14, management, control, resource allocation, etc.

The RS 12 is a device for relaying a signal between the BS 11 and the UE 14, and is also referred to as another terminology such as a relay node (RN), a repeater, an advanced RS (ARS), etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), an advanced mobile station (AMS), a user terminal (UT), a subscriber station (SS), a wireless device, a personal digital assistant (PDA), a wireless modem, a handheld device, an access terminal (AT), etc. Hereinafter, a macro UE (or Ma UE) denotes a UE that directly communicates with the BS 11, and a relay UE (or Re UE) denotes a UE that communicates with the RS. To improve a data transfer rate depending on a diversity effect, the macro UE 13 located in the cell of the BS 11 can also communicate with the BS 11 via the RS 12.

Hereinafter, a downlink (DL) denotes communication link from the BS 11 to the macro UE 13, and an uplink (UL) denotes communication link from the macro UE 13 to the BS 11.

Figure 2:
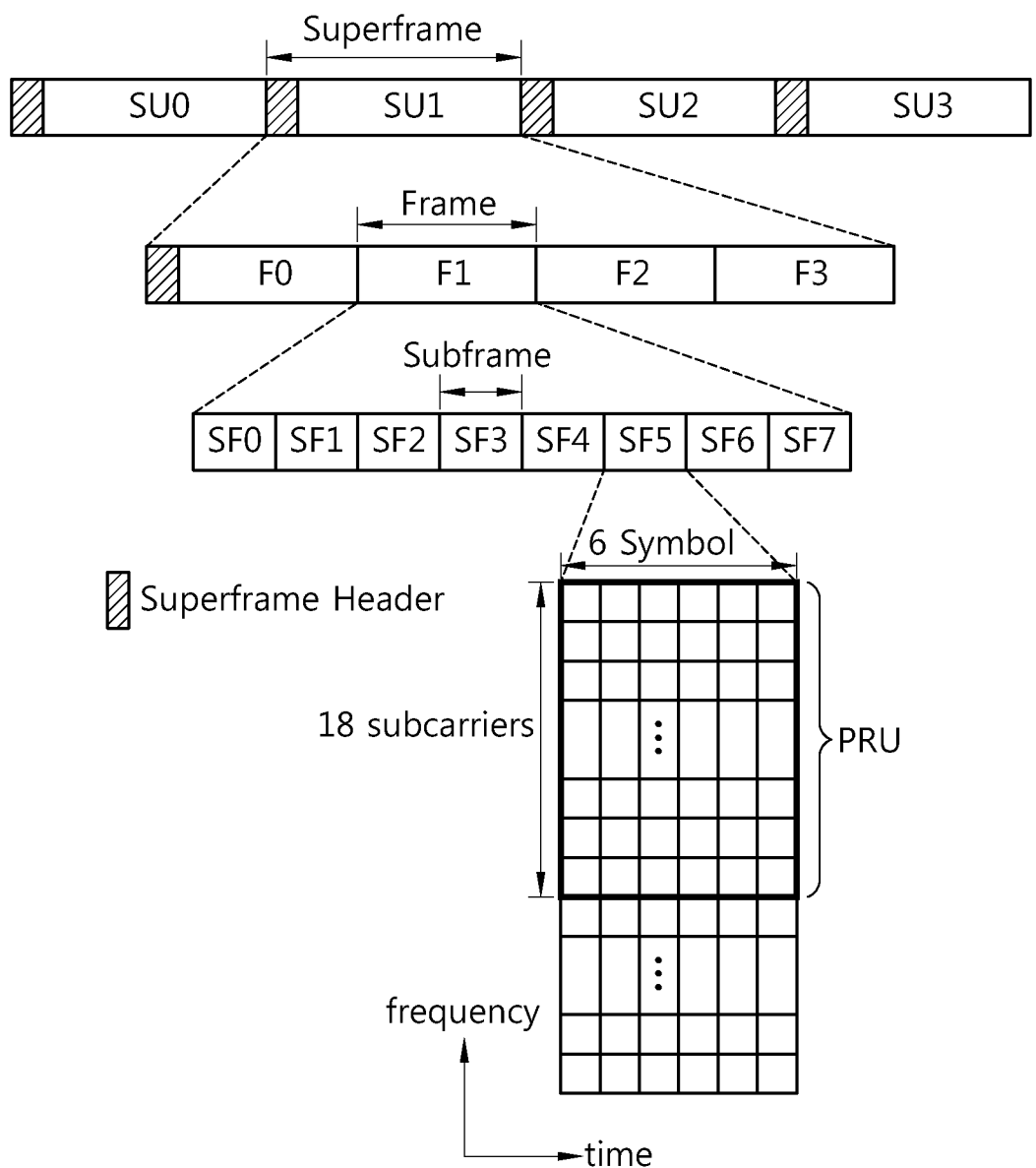
FIG. 2 shows an example of a frame structure.

FIG. 2 shows an example of a frame structure.

A superframe (SF) includes a superframe header (SFH) and four frames F0, F1, F2, and F3. Each frame may have the same length in the SF. Although it is shown that each SF has a size of 20 milliseconds (ms) and each frame has a size of 5 ms, the present invention is not limited thereto. A length of the SF, the number of frames included in the SF, the number of subframes included in the frame, or the like may change variously. The number of subframes included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH can be transmitted in every superframe.

One frame includes 8 subframes SF0, SF1, SF2, SF3, SF4, SF5, SF6, and SF7. Each subframe can be used for UL or DL transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) can be applied to the frame. In the TDD, each subframe is used in UL or DL transmission at the same frequency and at a different time. That is, subframes included in a TDD frame are divided into a UL subframe and a DL subframe in the time domain. In the FDD, each subframe is used in UL or DL transmission at the same time and at a different frequency. That is, subframes included in an FDD frame are divided into a UL subframe and a DL subframe in the frequency domain. UL transmission and DL transmission occupy different frequency bands and can be simultaneously performed.

One OFDM symbol includes a plurality of subcarriers, and the number of subcarriers is determined according to a fast Fourier transform (FFT) size. There are several types of subcarriers. A subcarrier type may include a data subcarrier for data transmission, a pilot subcarrier for various estimations, and a null carrier for a guard band and a DC carrier. A parameter for characterizing an OFDM symbol includes BW, $N_{used}$, n, G, etc. BW denotes a nominal channel bandwidth. $N_{used}$ denotes the number of subcarriers in use (including a DC subcarrier). n denotes a sampling factor. This parameter is used to determine a subcarrier spacing and a useful symbol time together with BW and $N_{used}$. G denotes a ratio of a CP time and a useful time.

Table 1 below shows an OFDMA parameter.

TABLE 1

| | | | Channel bandwidth, BW(MHz) | | | | |
|---|---|---|---|---|---|---|---|
| | | | 5 | 7 | 8.75 | 10 | 20 |
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time, $T_b$(μs) | | | 91.4 | 128 | 102.4 | 91.4 | 91.4 |
| G = 1/8 | Symbol time, $T_s$(μs) | | 102.857 | 144 | 115.2 | 102.857 | 102.857 |
| | FDD | Number of ODFMA symbols per 5 ms frame | 48 | 34 | 43 | 48 | 48 |
| | | Idle time(μs) | 62.857 | 104 | 46.40 | 62.857 | 62.857 |
| | TDD | Number of ODFMA symbols per 5 ms frame | 47 | 33 | 42 | 47 | 47 |
| | | TTG + RTG(μs) | 165.714 | 248 | 161.6 | 165.714 | 165.714 |
| G = 1/16 | Symbol time, $T_s$(μs) | | 97.143 | 136 | 108.8 | 97.143 | 97.143 |
| | FDD | Number of ODFMA symbols per 5 ms frame | 51 | 36 | 45 | 51 | 51 |
| | | Idle time(μs) | 45.71 | 104 | 104 | 45.71 | 45.71 |
| | TDD | Number of ODFMA symbols per 5 ms frame | 50 | 35 | 44 | 50 | 50 |
| | | TTG + RTG(μs) | 142.853 | 240 | 212.8 | 142.853 | 142.853 |
| G = 1/4 | Symbol time, $T_s$(μs) | | 114.286 | 160 | 128 | 114.286 | 114.286 |
| | FDD | Number of ODFMA symbols per 5 ms frame | 43 | 31 | 39 | 43 | 43 |
| | | Idle time(μs) | 85.694 | 40 | 8 | 85.694 | 85.694 |
| | TDD | Number of ODFMA symbols per 5 ms frame | 42 | 30 | 38 | 42 | 42 |
| | | TTG + RTG(μs) | 199.98 | 200 | 136 | 199.98 | 199.98 |

TABLE 1-continued

| | Channel bandwidth, BW(MHz) | | | | |
|---|---|---|---|---|---|
| | | 5 | 7 | 8.75 | 10 | 20 |
| Number of Guard | Left | 40 | 80 | 80 | 80 | 160 |
| subcarriers | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ is smallest power of two greater than $N_{used}$. A sampling factor $F_s$ is floor(n·BW/8000)×8000, a subcarrier spacing $\Delta f$ is $F_s/N_{FFT}$, a useful symbol time $T_b$ is $1/\Delta f$, a CP time $T_g$ is $G \cdot T_b$, an OFDMA symbol time $T_s$ is $T_b+T_g$, and a sampling time is $T_b/N_{FFT}$.

Figure 3:
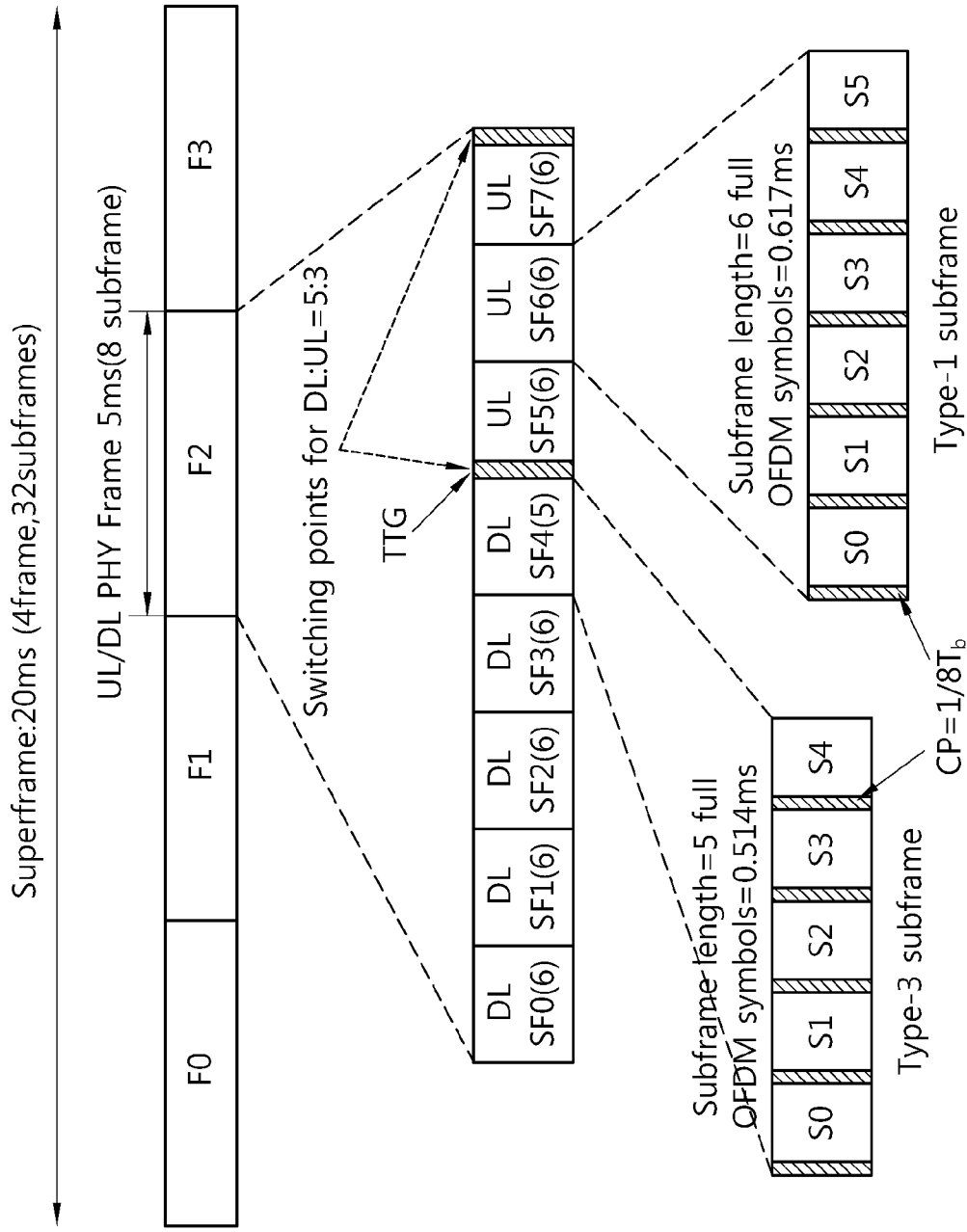
FIG. 3 shows an example of a time division duplexing (TDD) frame structure.

FIG. 3 shows an example of a TDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and a ratio of a DL subframe to a UL subframe is 5:3. The TDD frame structure of FIG. 3 can be used when a bandwidth is 5 MHz, 10 MHz, or 20 MHz. The last DL subframe SF4 includes 5 OFDM symbols, and the remaining subframes include 6 OFDM symbols.

Figure 4:
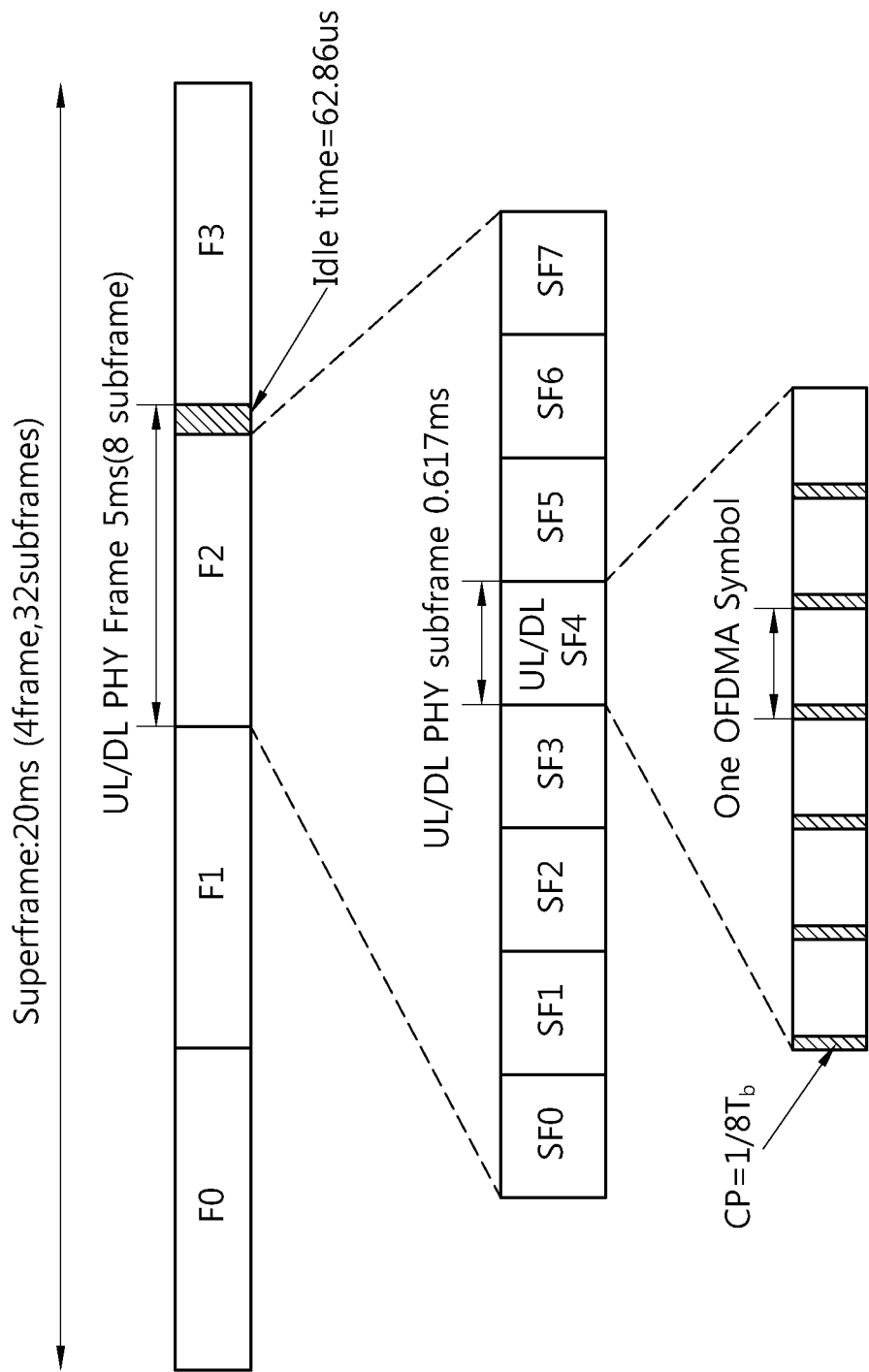
FIG. 4 shows an example of a frequency division duplexing (FDD) frame structure.

FIG. 4 shows an example of an FDD frame structure. In this structure, G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and all subframes include a DL region and a UL region. The FDD frame structure of FIG. 4 can be used when a bandwidth is 5 MHz, 10 MHz, or 20 MHz.

Figure 5:
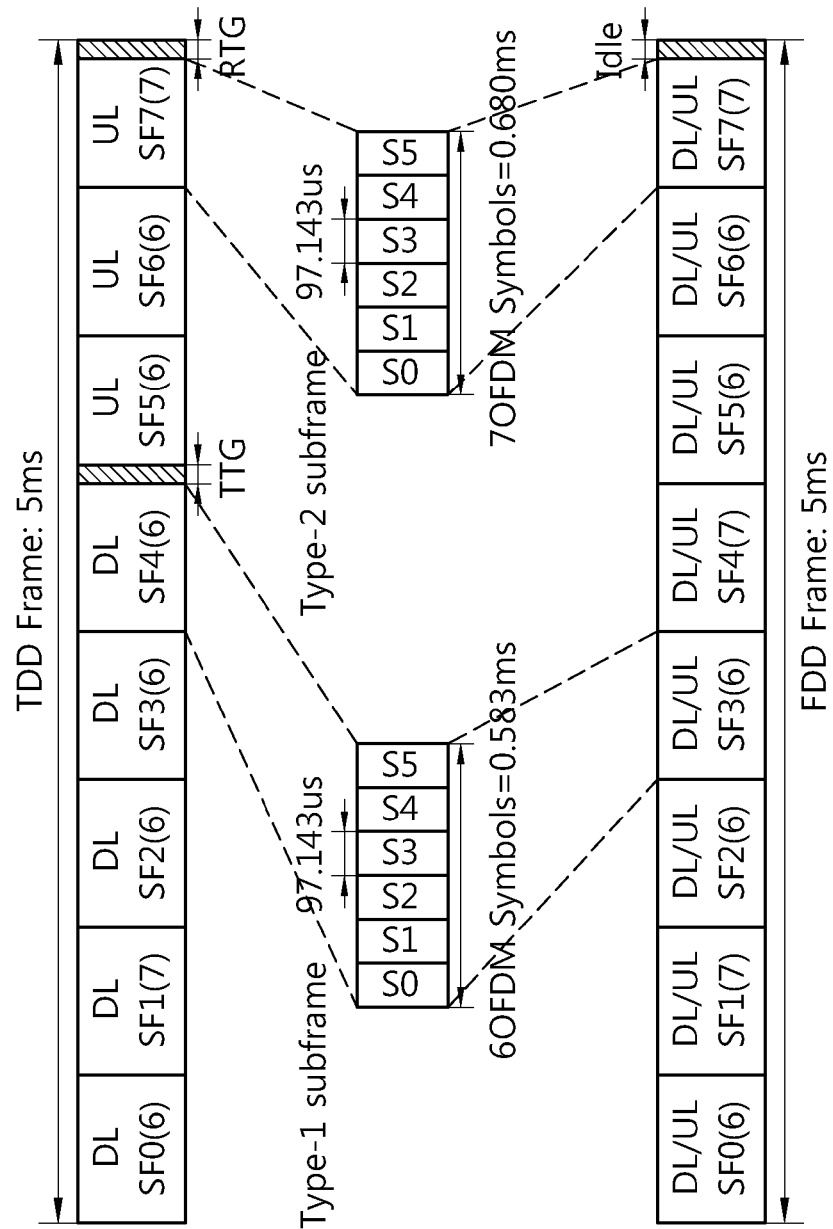
FIG. 5 shows an example of a frame structure.

FIG. 5 shows an example of a frame structure. In this example, G=1/16. The frame structure of FIG. 5 can apply both to FDD and TDD systems. There are 8 subframes SF0, SF1, SF2, SF3, SF4, SF5, SF6, and SF7, and a ratio of a DL subframe to a UL subframe is 5:3. The TDD frame structure can apply to a case where a bandwidth is 5 MHz, 10 MHz, or 20 MHz. Each subframe may include 6 or 7 OFDM symbols.

The aforementioned frame structures can apply between a BS and a macro UE. However, when a wireless communication system employs an RS, it is difficult to apply to the RS the same frame structure applied between the BS and the macro UE. Since the RS has to transmit its DL control information (e.g., a preamble or a superframe header (SFH), etc.), a radio resource region capable of transmitting a signal to the relay UE in a downlink is required. Further, since the RS receives a signal from the relay UE and thereafter decodes and transmits it to the BS, a radio resource region capable of transmitting a signal in an uplink is required. The BS also requires the radio resource region capable of receiving a signal in an uplink. The RS transmits a signal to the relay UE or receives a signal from the BS in the same frequency band. In addition, the RS receives a signal from the relay UE or transmits a signal to the BS in the same frequency band. Therefore, the RS requires a transition gap in a process of switching a signal transmission/reception operation. It is assumed that the RS is not able to receive or transmit a signal in the transition gap in general. By considering this aspect, a frame structure applicable to the wireless communication system employing the RS will be described. A frame structure described below and a frame transmission method depending on the frame structure can apply to a non-transparent RS having 2 hops (i.e., an RS with a BS-RS-UE structure) or 3 hops (i.e., RSs 1 and 2 with a BS-RS1-RS2-UE structure) and can apply to a transparent RS. In addition, they can also apply not only to distributed scheduling but also centralized scheduling.

As a preamble, the RS can use a unique sequence different from that used in the BS. In this case, by using the preamble, the UE can know whether a service received by the UE is provided from the BS or the RS. This is referred to as awareness. Since the UE can be aware of whether the service is provided from the RS, the RS can use a frame structure different from that used in the BS. The frame structure different from that used in the BS may include a subframe including a transition gap. In communication between the RS and the UE, the UE may perform transmission and reception of signals according to a frame structure different from a frame structure used for communication with the BS. If the UE is not aware of whether the service is performed from the BS or the RS, the frame structure and the transition gap have to be determined such that the UE is able to use the service of the RS similarly to the case where the service is provided from the BS. In this case, the frame structure between the RS and the BS may be different from the frame structure between the UE and the BS. The RS receives frame configuration information regarding an RS frame from the BS, and configures the RS frame according to the frame configuration information. In the RS frame, the frame configuration information may include information indicating a radio resource region for communication with the relay UE and a radio resource region for communication with the BS. The BS can transmit the frame configuration information by including it in DL control information. For example, the frame configuration information can be transmitted by being included in a superframe header. In this case, the frame configuration information can apply to a plurality of frames. The RS frame configured according to the frame configuration information will be described below in detail. The RS transmits or receives a signal to the relay UE or the BS according to the configured RS frame structure.

Terms will be first defined for clear understanding of the invention.

Figure 6:
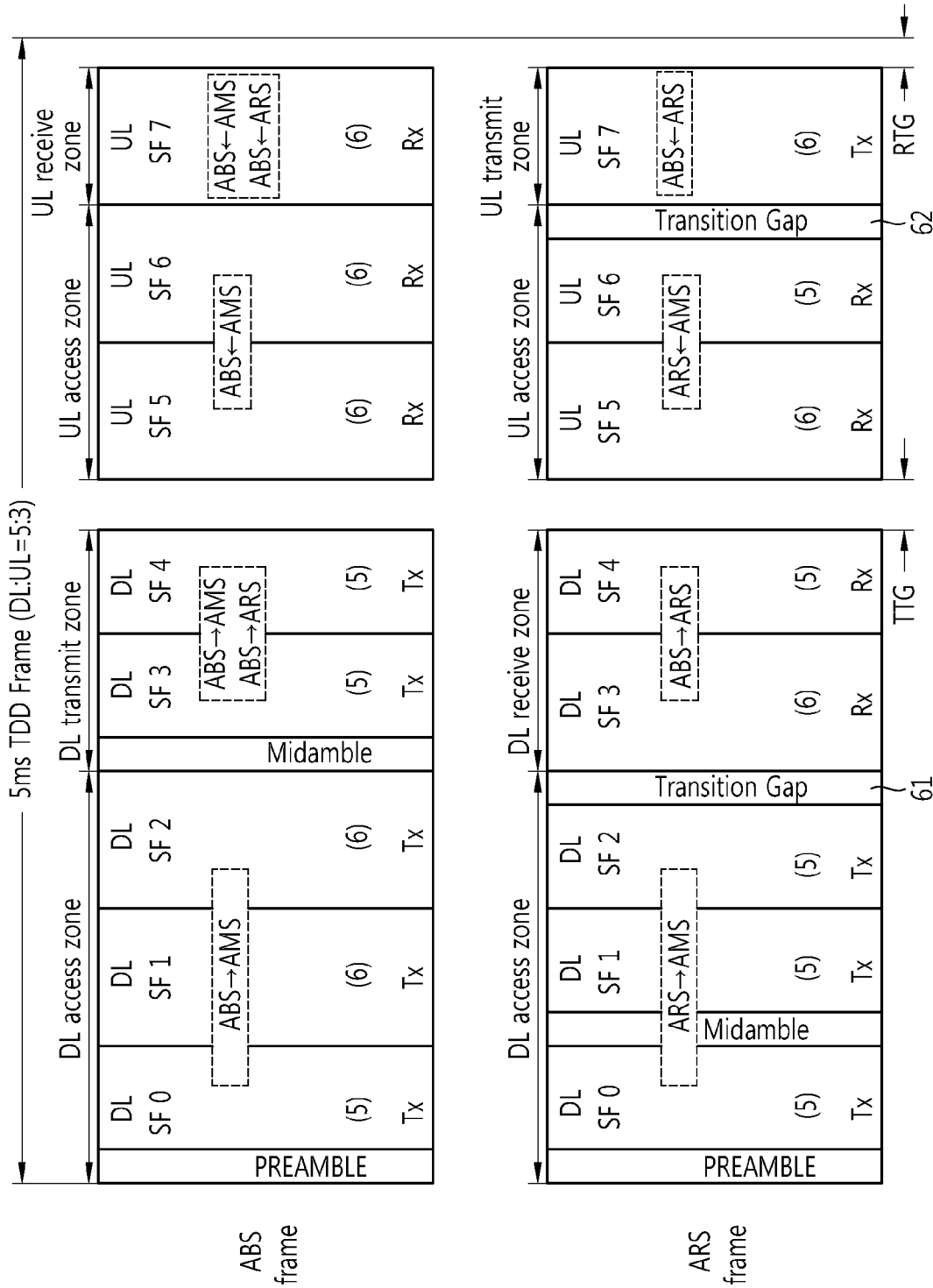
FIG. 6 shows a TDD frame structure according to an embodiment of the present invention.

FIG. 6 shows a TDD frame structure according to an embodiment of the present invention. Hereinafter, throughout the drawings, a numeral character in brackets included in each subframe represents the number of available OFDM symbols.

In a BS frame (ABS frame in FIG. 6), a DL access zone denotes a radio resource region in which a BS(ABS) transmits a signal to a macro UE(AMS). A DL transmit zone denotes a radio resource region in which the BS transmits a signal to an RS(ARS) and/or the macro UE. A UL access zone denotes a radio resource region in which the BS receives a signal from the macro UE. A UL receive zone denotes a radio resource region in which the BS receives a signal from the RS and/or the macro UE.

In an RS frame (ARS frame in FIG. 6), a DL access zone denotes a radio resource region in which the RS(ARS) transmits a signal to the relay UE(AMS). A DL receive zone denotes a radio resource region in which the RS(ARS) receives a signal from the BS(ABS). A UL access zone denotes a radio resource region in which the RS receives a signal from the relay UE. A UL transmit zone denotes a radio resource region in which the RS transmits a signal to the BS.

The DL receive zone is also referred to as a DL relay zone. The UL transmit zone is also referred to as a UL relay zone.

Between a DL region and a UL region, a transmit/receive transition gap (TTG) is located. Between the UL region and its subsequent frame, a receive/transmit transition gap (RTG) is located. The TTG or the RTG may include an idle time according to a CP length in order to avoid inter-symbol interference. The TTG may be longer than one symbol.

In an RS frame, a transition gap(61, 62) may be included in the DL access zone and the UL access zone. In FIG. 6, the transition gap is inserted to a last OFDM symbol of the DL access zone and a last OFDM symbol of the UL access zone for example.

Figure 7:
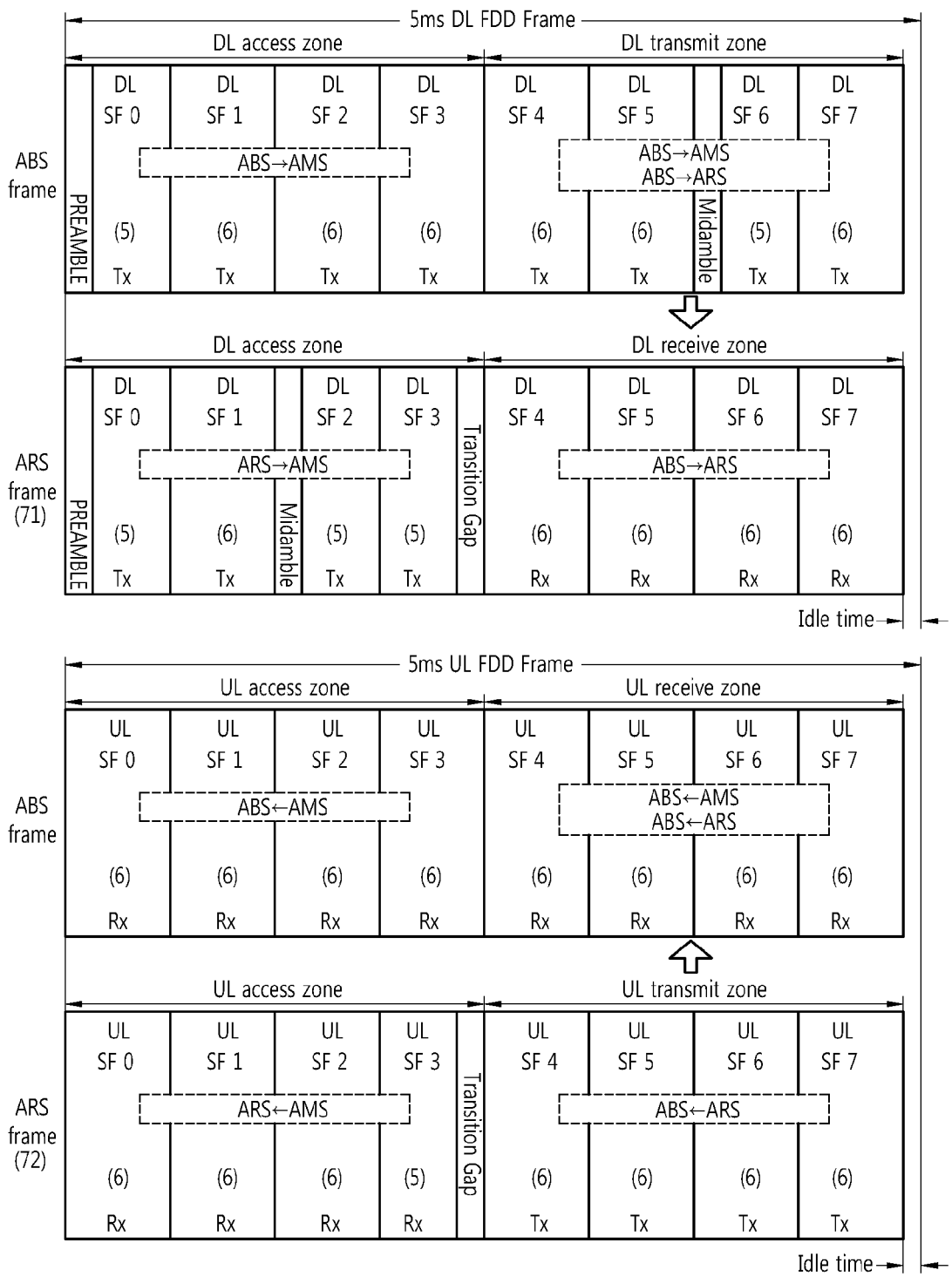
FIG. 7 shows an FDD frame structure according to an embodiment of the present invention.

FIG. 7 shows an FDD frame structure according to an embodiment of the present invention.

A transition gap is inserted to a DL RS frame (ARS frame (71) in FIG. 7) and a UL RS frame (ARS frame (72) in FIG. 7). In FIG. 7, the transition gap is inserted to a DL access zone and a UL access zone for example.

In the aforementioned examples, zones (for example, DL access zone, DL transmit zoen etc.) can be uniformly split. If a frame includes an odd number of subframes, the DL access zone or the UL access zone in the RS frame (71, 72) may include a subframe including a transition gap so that one more subframe is included than a DL receive zone or a UL transmit zone. As described above, frame configuration information for defining the zones can be indicated by using DL broadcast/multicast control information (e.g., a superframe header) transmitted by a BS. The zones can be indicated by at least one superframe or frame.

A frame structure may differ according to a location of a specific zone in which a transition gap is located in a frame, which will be described below. Although a frame structure having a ratio of a DL subframe to a UL subframe is 5:3 is described for example in FIG. 8 to FIG. 11, the present invention is not limited thereto. Therefore, the present invention can also apply to another frame having a different DL/UL ratio.

Figure 8:
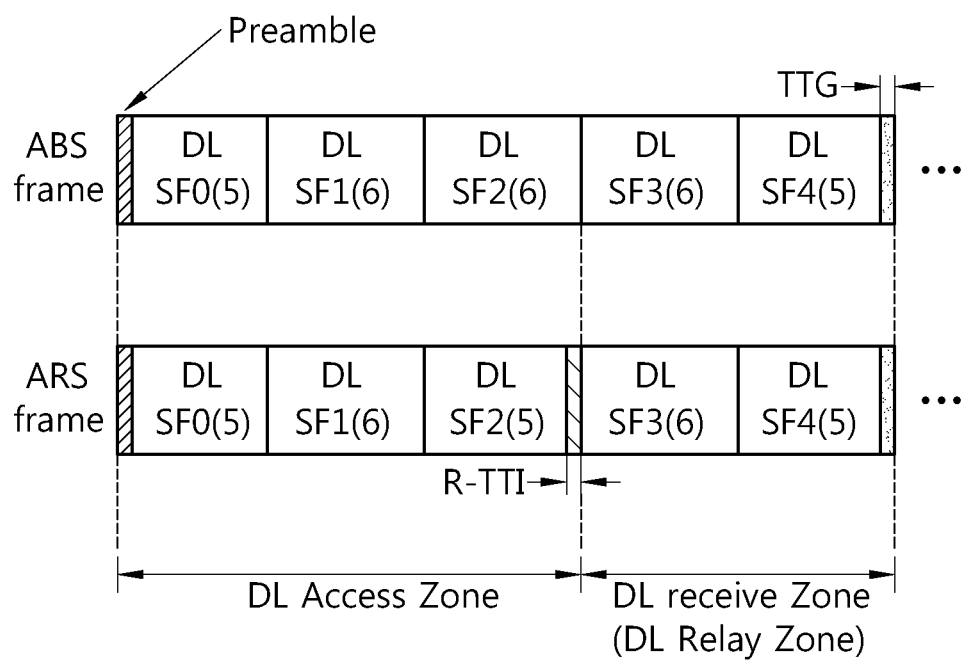
FIG. 8 shows a frame structure when a downlink (DL) access zone includes a transition gap.

FIG. 8 shows a frame structure when a DL access zone includes a transition gap.

Referring to FIG. 8, the transition gap may be equal to a relay transmit to receive transition gap (R-TTI) or may be included in the R-TTI. The term R-TTI is used to represent the meaning of a switching time from transmission of a signal by an RS to a relay UE to reception of a signal by the RS from a BS. The R-TTI can be inserted to a last symbol of the DL access zone of an RS frame. The R-TTI may be set such that an ARS transmit/receive transition gap (ARSTTG) between the RS and a super-ordinate station of the RS and a round trip delay (RTD) can be aligned (the same will also apply hereinafter).

In a case where the transition gap is included in the DL access zone as shown in FIG. 8, if a subframe including the transition gap is a type-1 subframe, only 5 symbols can be used out of 6 symbols (such a subframe is hereinafter referred to as a 5-symbol subframe).

When a signal is transmitted to the relay UE by using the 5-symbol subframe, the RS can transmit the signal by configuring the 5-symbol subframe into a type-3 subframe. That is, if the transition gap is included in the type-1 subframe of the RS frame, the RS can use 5 symbols. In this case, the type-1 subframe can be used in a format that only data is transmitted without transmission of a control channel similarly to the type-3 subframe. That is, the type-1 subframe can be used as the type-3 subframe. Alternatively, when transmitting a signal, a last symbol can be punctured to configure a punctured type-1 subframe.

The punctured type-1 subframe can be transmitted by using two methods: 1) a method in which data is allocated to 6 symbols in the same manner as the type-1 subframe and thereafter the last symbol is punctured; and 2) a method in which data is allocated only to 5 symbols in the same manner as the type-1 subframe and the last symbol is punctured. The second method 2) is different from a method of transmitting a signal by configuring the type-3 subframe since allocation of the data to the 5 symbols is different from that used in a case of transmitting a signal by configuring the type-3 subframe. Hereinafter, the punctured type-1 subframe can selectively use one of the aforementioned two methods. The punctured type-1 subframe may experience performance deterioration to some extent, but has an advantage in that the relay UE can easily detect.

Although not shown in FIG. 8, if the subframe including the transition gap is a type-2 subframe which includes 7 symbols in total, the RS can transmit a signal by configuring the type-1 subframe which includes 6 symbols or a punctured type-2 subframe in which a last symbol is punctured. Similarly to the punctured type-1 subframe, the punctured type-2 subframe also can use two methods: 1) a method in which data is allocated to 7 symbols in the same manner as the type-2 subframe and thereafter the last symbol is punctured; and 2) a method in which data is allocated only to 6 symbols in the same manner as the type-2 subframe and the last symbol is punctured.

Figure 9:
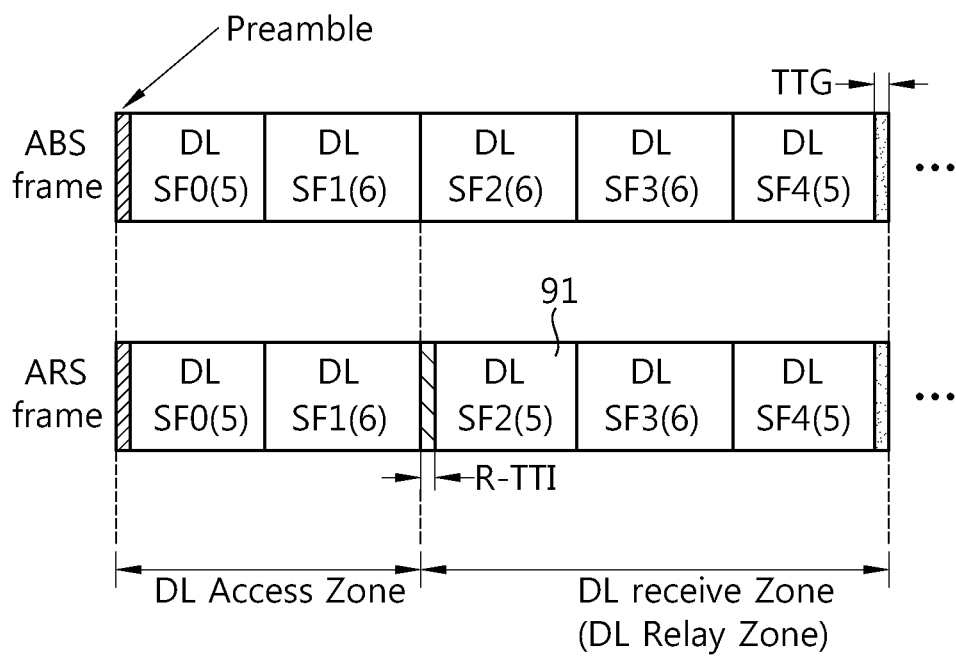
FIG. 9 shows a frame structure when a DL receive zone includes a transition gap.

FIG. 9 shows a frame structure when a DL receive zone includes a transition gap.

As described above, the DL receive zone is also referred to as a DL relay zone.

Referring to FIG. 9, an R-TTI which is a transition gap (or which includes the transition gap) can be inserted to a first symbol of the DL relay zone of an RS frame (ARS frame in FIG. 9). In this case, a BS transmits a type-1 subframe to an RS in a 5-symbol subframe 91 and the BS may transmit the type-1 subframe to a macro UE. The RS can decode the type-1 subframe except for a first symbol in the 5-symbol subframe 91. The RS may experience performance deterioration. However, since a link between the BS and the RS has superior quality to a link between the BS and the macro UE in general, the performance deterioration can be negligible.

Alternatively, in the 5-symbol subframe 91, the BS can transmit a signal to the RS by configuring the type-3 subframe and transmit a signal to the macro UE by configuring the type-1 subframe. That is, in the 5-symbol subframe 91 including the transition gap, a different type subframe can be transmitted to the RS and the macro UE. Although this may result in a disadvantage in that the BS becomes more complex and a new type subframe is required, but also has an advantage in that performance deterioration can be avoided.

Figure 10:
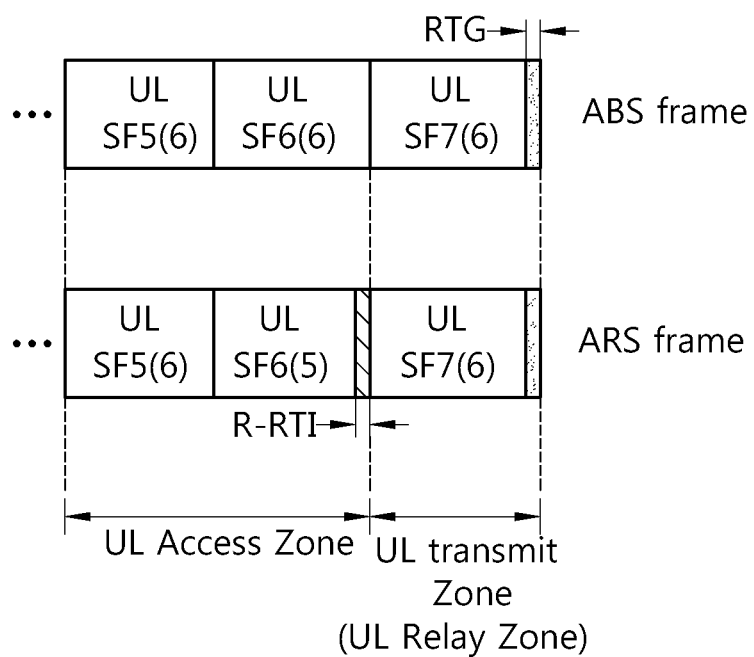
FIG. 10 shows a frame structure when an uplink (UL) access zone includes a transition gap.

FIG. 10 shows a frame structure when a UL access zone includes a transition gap.

Referring to FIG. 10, a relay receive to transmit transition interval (R-RTI) which is a transition gap (or which includes the transition gap) can be inserted to a last symbol of the UL access zone. The term R-RTI is used to represent the concept of a switching time from reception of a signal by an RS from a relay UE to transmission of a signal by the RS to a BS. The R-RTI may be set such that an ARS receive/transmit transition gap (ARSRTG) between the RS and a super-ordinate station of the RS and a round trip delay (RTD) can be aligned (the same will also apply hereinafter).

Referring to FIG. 10, the RS receives a signal from the relay UE in a 5-symbol subframe (i.e., UL SF 6). In this case, the relay UE transmits a type-1 subframe, and the RS can receive a signal only for 5 symbols of the type-1 subframe. The relay UE may experience performance deterioration, but advantageously, there is no additional complexity increase. Alternatively, in the 5-symbol subframe (i.e., UL SF 6), the relay UE can transmit a signal by configuring a type-3 subframe or can transmit a signal by configuring a punctured type-1 subframe in which a last symbol is punctured. On the other hand, the macro UE can transmit the type-1 subframe to the BS.

Figure 11:
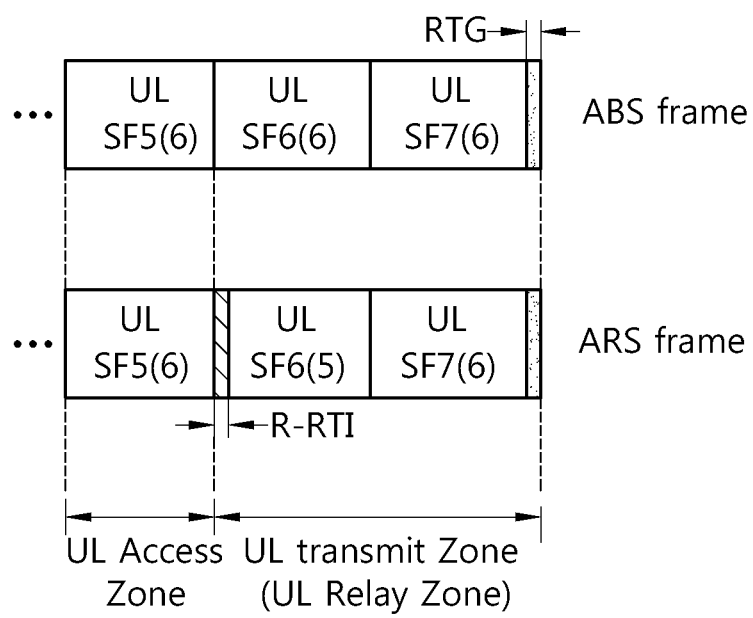
FIG. 11 shows a frame structure when a UL transmit zone includes a transition gap.

FIG. 11 shows a frame structure when a UL transmit zone includes a transition gap.

As described above, the UL transmit zone is also referred to as a UL relay zone.

Referring to FIG. 11, an R-RTI which is a transition gap (or which includes the transition gap) can be inserted to a first symbol of the UL relay zone.

In a 5-symbol subframe (i.e., UL SF 6) including the transition gap, an RS can transmit a signal to a BS by using 5 symbols except for the first symbol. For example, the RS can perform transmission after puncturing the first symbol including the transition gap from the subframe in which the transition gap is included. On the other hand, a macro UE can transmit a signal by using a type-1 subframe. Then, the BS receives the type-1 subframe from the macro UE and the BS receives only 5 symbols except for the first symbol from the RS.

In the aforementioned description of FIG. 10 or FIG. 11, if a type-2 subframe (which has 7 OFDM symbols) exists in two subframes located in a boarder between a UL access zone and a UL transmit zone, one OFDM symbol in the type-2 subframe can be used as the transition gap and the type-2 subframe can be used as if it is the type-1 subframe.

If existence of a type-3 subframe is inevitable due to the transition gap, the type-3 subframe can be present in the UL transmit zone. That is, the transition gap is inserted to the UL transmit zone. Then, since the type-3 subframe does not exist in the UL access zone, there is no influence on the UE, and only the RS performs transmission by using the type-3 subframe. In this case, the BS can allocate a radio resource to the macro UE in the same time as the type-3 subframe of an RS frame. The BS can allocate the type-1 subframe since the transition gap is not required.

It is preferable to have same ratio of the UL access zone to the UL transmit zone. However, the present invention is not limited thereto. Since a link between the BS and the RS may have better quality, a ratio of the UL access zone may be increased.

If the RS has to puncture one subframe entirely or partially due to the transition gap, it is preferable to puncture the subframe so that the ratio of the UL access zone to the UL transmit zone becomes one. In other words, the subframe is preferably punctured so that the number of subframes not punctured is equal in the UL access zone and the UL transmit zone.

In order to prevent a data loss resulted from the punctured subframe, an adjacent subframe can be extended in length to the punctured subframe so as to use a new type subframe having a long length. For example, if a last subframe of the UL access zone is punctured, a second last subframe of the UL access zone can be extended in length. In this case, the second last subframe can be defined as a type-4 subframe which includes 9 OFDM symbols.

Alternatively, if the last subframe of the UL access zone of the RS frame is a type-3 subframe due to the transition gap, the subframe can be combined with its preceding subframe to form one long subframe and can be used as a new type subframe. Alternatively, all subframes included in the UL access zone of the RS frame can be combined into one long subframe to be used.

The UL frame structure considering the RS, the transition gap, a position of the type-3 subframe, and a correlation can apply irrespective of a CP length, a TDD/FDD mode, a ratio of a DL subframe to a UL subframe, etc.

Figure 12:
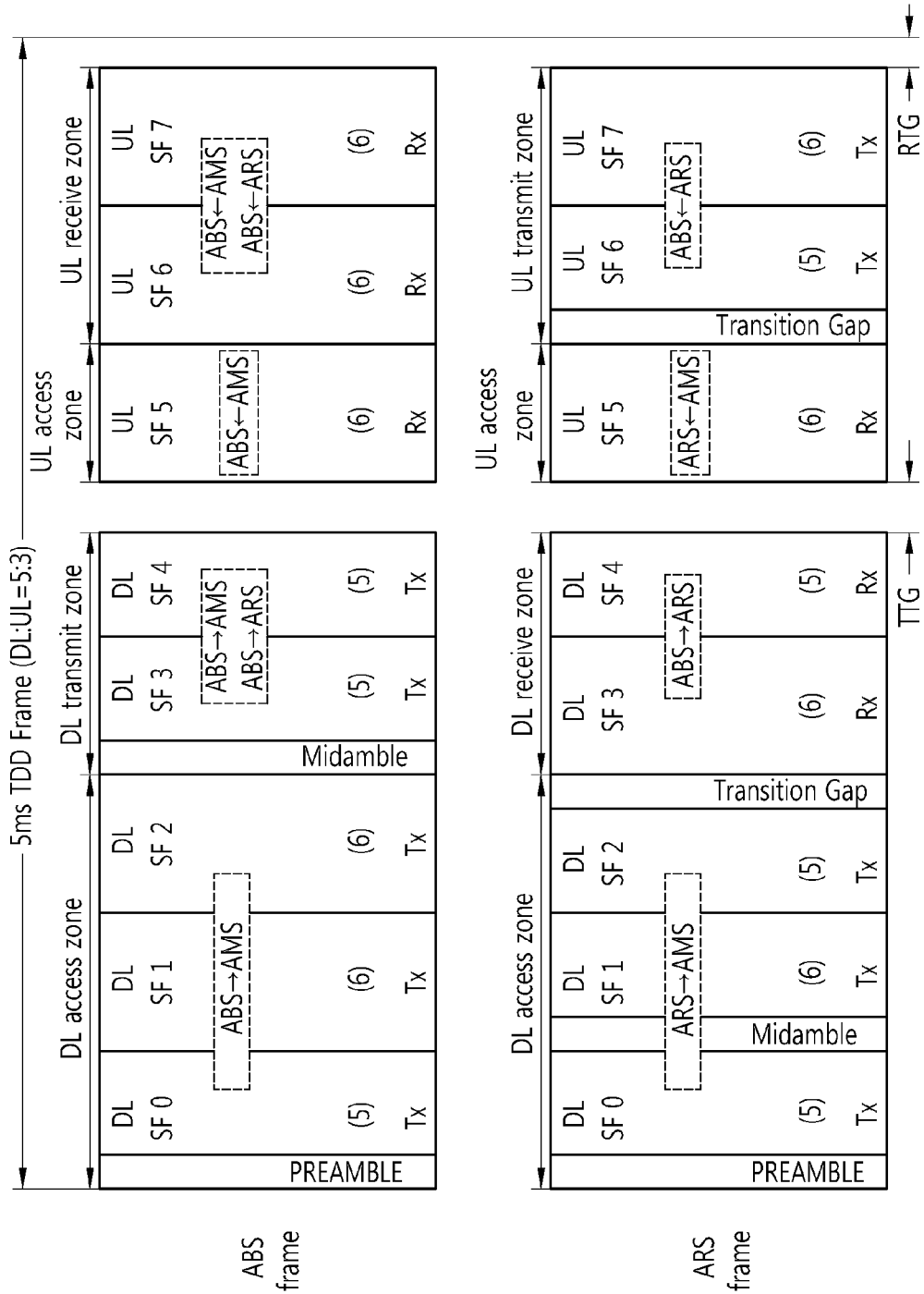
FIG. 12 shows an example of a method of transmitting a frame between an base station (BS) and a relay station (RS).

FIG. 12 shows an example of a method of transmitting a frame between a BS and an RS.

Referring to FIG. 12, a transition gap is inserted and included in a first symbol of a UL transmit zone. In a 5-symbol subframe (i.e., UL SF 6) including the transition gap, the RS can transmit a signal to the BS by configuring a type-1 subframe in which a first symbol is punctured. Then, the BS receives the signal only for 5 symbols from the RS in a UL receive zone. On the other hand, from a macro UE, the BS can receive the signal for the type-1 subframe, i.e., 6 symbols. Therefore, the BS can perform the same decoding on a subframe received from the macro UE and a subframe received from the RS, and thus there is an advantage in that complexity can be decreased. In addition, since a signal is received by using the same type of subframe from the perspective of the BS, increase of overhead can be avoided in the process of decoding.

Figure 13:
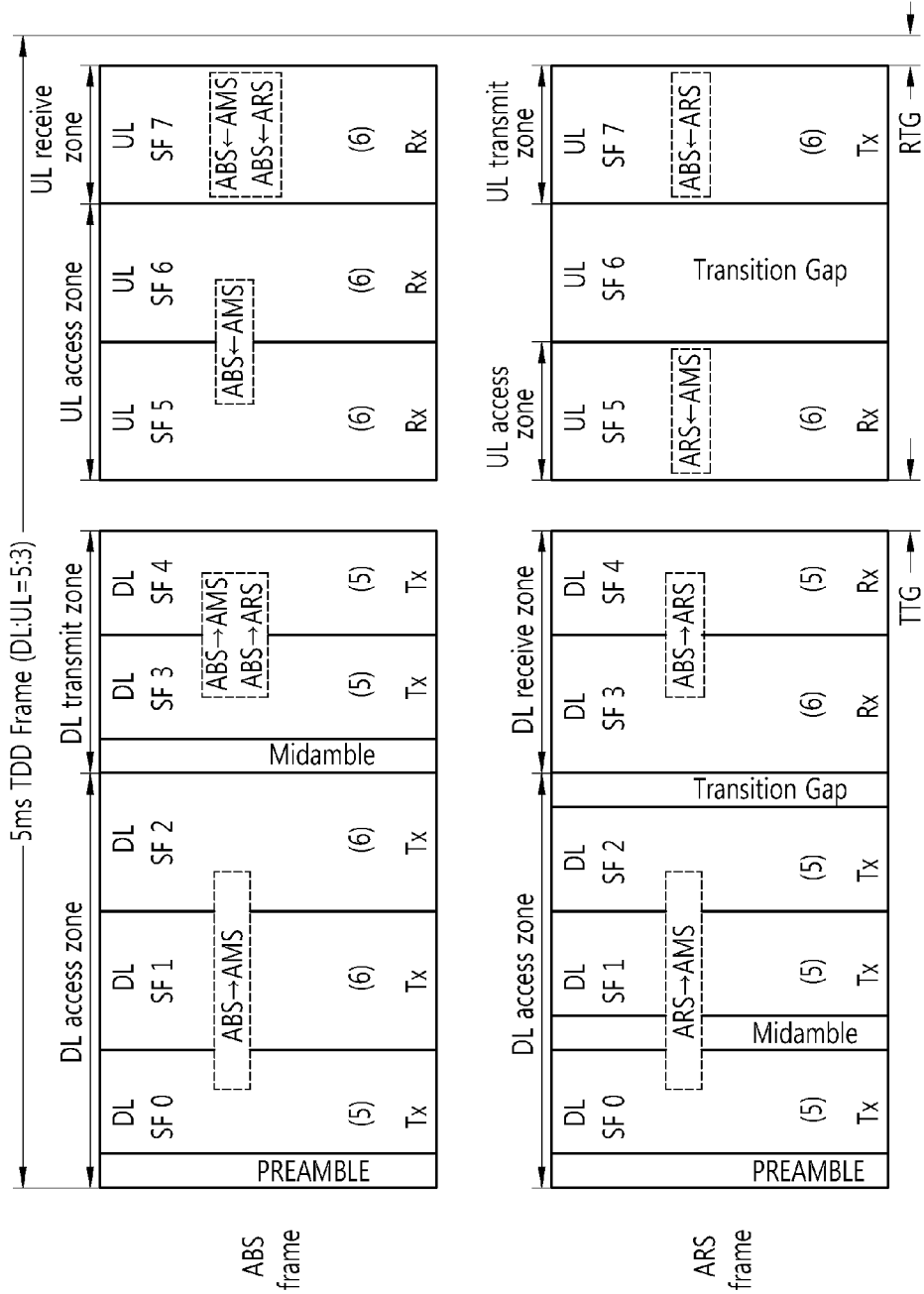
FIG. 13 shows another example of a method of transmitting a frame between a BS and an RS.

FIG. 13 shows another example of a method of transmitting a frame between a BS and an RS.

The example of FIG. 13 is different from the example of FIG. 12 in that the RS does not entirely use a subframe including a transition gap (i.e., a UL SF 6 of an RS frame). That is, the subframe including the transition gap can be entirely punctured in order not to include a type-3 subframe. In this case, the entire subframe can act as the transition gap.

Figure 14:
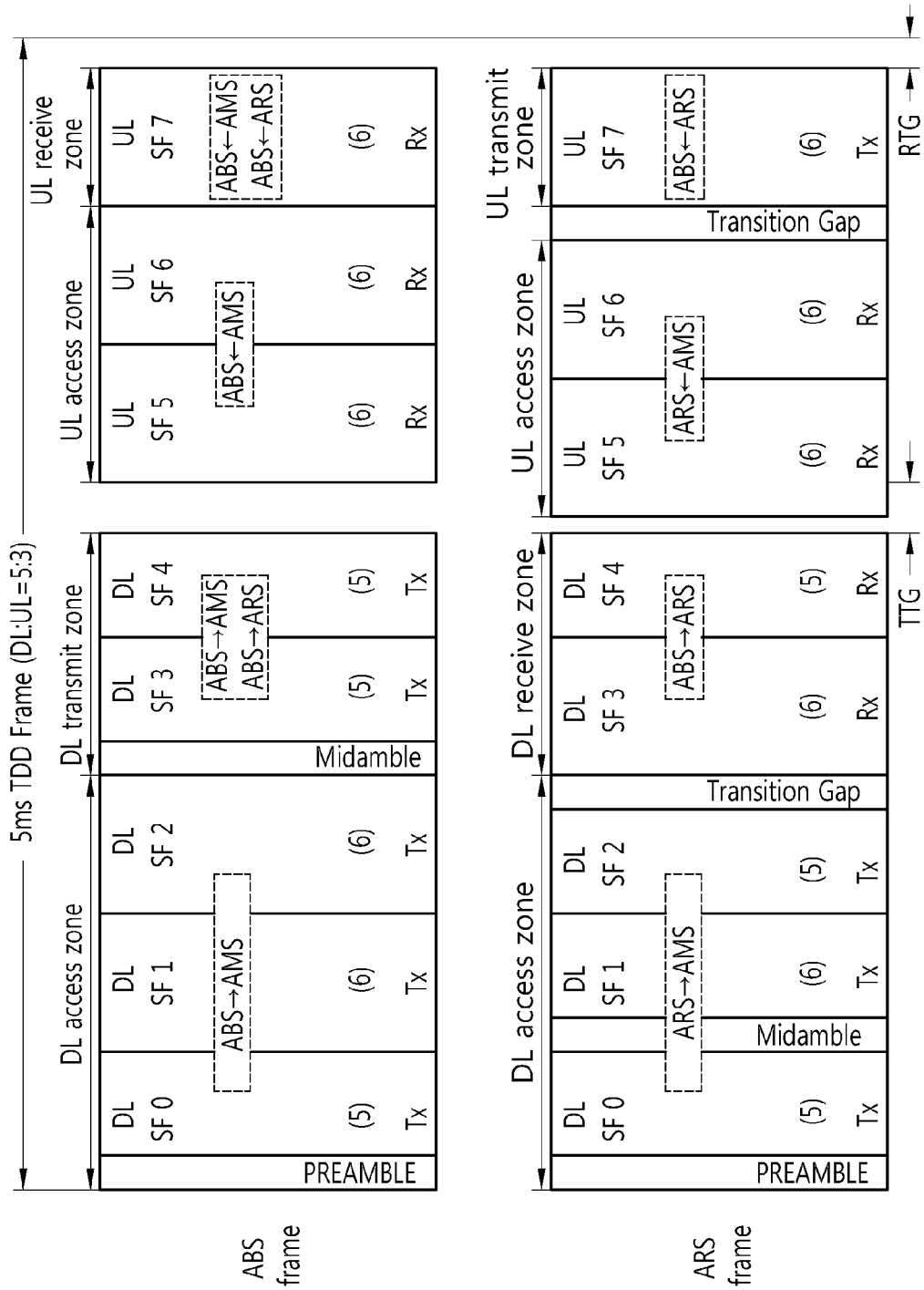
FIG. 14 shows another example of a method of transmitting a frame between a BS and an RS.

FIG. 14 shows another example of a method of transmitting a frame between a BS and an RS.

Referring to FIG. 14, the RS shifts a UL access zone toward the front of the subframe by one symbol. Then, an interval between a DL receive zone and the UL access zone is decreased by one symbol in comparison with the TTG in an RS frame (e.g., if the TTG is 105 us and one symbol is 102.857 us, the interval between the DL receive zone and the UL access zone is 2.143 us). One symbol produced as a result of shifting the UL access zone by one symbol can be used as the transition gap.

The RS receives a signal from the BS in the DL receive zone, and this signal is received with a time delay called TA with respect to a time at which the BS transmits the signal. The RS receives the signal from a relay UE in the UL access zone after the DL receive zone. If the interval between the DL receive zone and the UL access zone is longer than the TA in terms of time, there is no problem in receiving the signal from the relay UE in the UL access zone. The RS can transmit the signal to the BS by using a type-1 subframe in a UL transmit zone.

According to the present invention, a frame structure considering a transition gap can be used in a wireless communication system employing a relay station. The relay station can be employed in the wireless communication system while minimizing influence on a user equipment.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting a frame of a relay station (RS) in a wireless communication system utilizing the RS, the method comprising:
    receiving frame configuration information related to an RS frame from a base station (BS);
    configuring a frame comprising a downlink (DL) access zone for transmitting a signal to a relay user equipment (UE), a DL relay zone for receiving a signal from the BS, an uplink (UL) access zone for receiving a signal from the relay UE connected to the RS, a UL relay zone for transmitting a signal to the BS, and a transition gap; and
    transmitting a signal in at least the DL access zone or the UL relay zone,
    wherein the transition gap is a switching time between a transmission operation and a reception operation of the RS and is included in at least the DL access zone or the UL relay zone, and
    wherein a DL access zone subframe that includes the transmission gap is formed by a type-3 subframe consisting of 5 symbols, among a type-1 subframe consisting of 6 symbols, a type-2 subframe consisting of 7 symbols, a type-3 subframe consisting of 5 symbols and a type-4 subframe consisting of 9 symbols, when the transition gap is included in a last symbol of the DL access zone and a corresponding DL access zone subframe of the BS is a type-1 subframe consisting of 6 symbols.

2. The method of claim 1, wherein the frame is a time division duplex (TDD) frame or a frequency division duplex (FDD) frame.

3. The method of claim 1, wherein each of the DL access zone and the DL relay zone comprises at least one time division duplex (TDD) DL subframe.

4. The method of claim 1, wherein each of the UL access zone and the UL relay zone comprises at least one time division duplex (TDD) UL subframe.

5. A method of transmitting a frame of a relay station (RS) in a wireless communication system utilizing the RS, the method comprising:
    receiving frame configuration information related to an RS frame from a base station (BS);
    configuring a frame comprising a downlink (DL) access zone for transmitting a signal to a relay user equipment (UE), a DL relay zone for receiving a signal from the BS, an uplink (UL) access zone for receiving a signal from the relay UE connected to the RS, a UL relay zone for transmitting a signal to the BS, and a transition gap; and
    transmitting a signal in at least the DL access zone or the UL relay zone,
    wherein the transition gap is a switching time between a transmission operation and a reception operation of the RS and is included in at least the DL access zone or the UL relay zone, and
    wherein a DL access zone subframe that includes the transmission gap is formed by a type-1 subframe consisting of 6 symbols, among a type-1 subframe consisting of 6 symbols, a type-2 subframe consisting of 7 symbols, a type-3 subframe consisting of 5 symbols and a type-4 subframe consisting of 9 symbols, when the transition gap is included in a last symbol of the DL access zone and a corresponding DL access zone subframe of the BS is a type-2 subframe consisting of 7 symbols.

6. A method of transmitting a frame of a relay station (RS) in a wireless communication system utilizing the RS, the method comprising:
    receiving frame configuration information related to an RS frame from a base station (BS);
    configuring a frame comprising a downlink (DL) access zone for transmitting a signal to a relay user equipment (UE), a DL relay zone for receiving a signal from the BS, an uplink (UL) access zone for receiving a signal from the relay UE connected to the RS, a UL relay zone for transmitting a signal to the BS, and a transition gap; and
    transmitting a signal in at least the DL access zone or the UL relay zone,
    wherein the transition gap is a switching time between a transmission operation and a reception operation of the RS and is included in at least the DL access zone or the UL relay zone, and
    wherein the RS allocates data to all symbols of a subframe comprising the transition gap and performs transmission after puncturing the first symbol comprising the transition gap when the transition gap is included in a first symbol of the UL relay zone.

7. The method of claim 1, wherein a ratio of time division duplex (TDD) DL subframes included in the DL access zone or the DL relay zone to TDD UL subframes included in the UL access zone or the UL relay zone is 6:2, 5:3, 4:4 or 3:5.

* * * * *